(12) United States Patent
Hayden

(10) Patent No.: US 11,315,244 B2
(45) Date of Patent: Apr. 26, 2022

(54) AUTOMATIC ORGAN FINDING FRAMEWORK

(71) Applicant: Siemens Medical Solutions USA, Inc., Malvern, PA (US)

(72) Inventor: Charles Hayden, Knoxville, TN (US)

(73) Assignee: Siemens Medical Solutions USA, Inc., Malven, PA (US)

( * ) Notice: Subject to any disclaimer, the term of this patent is extended or adjusted under 35 U.S.C. 154(b) by 56 days.

(21) Appl. No.: 16/807,198

(22) Filed: Mar. 3, 2020

(65) Prior Publication Data

US 2021/0279862 A1  Sep. 9, 2021

(51) Int. Cl.
*G06T 7/00* (2017.01)
*G06T 3/40* (2006.01)
*G06T 5/20* (2006.01)
*G06T 3/60* (2006.01)

(52) U.S. Cl.
CPC .......... *G06T 7/0012* (2013.01); *G06T 3/4084* (2013.01); *G06T 3/60* (2013.01); *G06T 5/20* (2013.01); *G06T 2207/30048* (2013.01)

(58) Field of Classification Search
CPC ....... G06T 7/0012; G06T 3/4084; G06T 3/60; G06T 5/20; G06T 2207/30048; G16H 30/40
See application file for complete search history.

(56) References Cited

U.S. PATENT DOCUMENTS

| | | | | |
|---|---|---|---|---|
| 5,797,396 A | * | 8/1998 | Geiser | G06T 7/66 382/128 |
| 9,949,643 B2 | * | 4/2018 | Garnavi | G06T 7/20 |
| 2002/0164061 A1 | * | 11/2002 | Paik | G06T 7/0012 382/131 |
| 2005/0113664 A1 | * | 5/2005 | Stefani | G06T 7/62 600/407 |
| 2009/0097726 A1 | * | 4/2009 | Rusko | G06T 7/0012 382/131 |
| 2015/0348229 A1 | * | 12/2015 | Aguirre-Valencia | G06T 19/20 345/419 |
| 2016/0163048 A1 | * | 6/2016 | Yee | G06F 3/04845 382/131 |
| 2016/0300343 A1 | * | 10/2016 | Gazit | G16H 50/50 |
| 2020/0380675 A1 | * | 12/2020 | Golden | G06T 7/0012 |
| 2021/0251610 A1 | * | 8/2021 | Stergiopoulos | A61B 8/4461 |

FOREIGN PATENT DOCUMENTS

JP      2014185991 A   * 10/2014

* cited by examiner

*Primary Examiner* — Vu Le
*Assistant Examiner* — Julius Chai

(57) ABSTRACT

A framework for automatically finding an organ in image data. In accordance with one aspect, a predetermined view of the organ is approximated by transforming the original image data to generate transformed image data. A best-match region in the transformed image data that best matches a synthesized geometric shape may then be found. The best-match region may be transformed into a volume space of the original image data to generate a location of the organ.

20 Claims, 4 Drawing Sheets

```
          1
         1 1     310
        1 2 1
       1 3 3 1
      1 4 6 4 1
    1 5 10 10 5 1
  1 6 15 20 15 6 1
```

AUTOMATIC ORGAN FINDING FRAMEWORK

TECHNICAL FIELD

The present disclosure generally relates to image processing, and more particularly to automatic organ finding.

BACKGROUND

The field of medical imaging has seen significant advances since the time X-Rays were first used to determine anatomical abnormalities. Medical imaging hardware has progressed from modern machines, such as Magnetic Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the location of anatomical structures and associated abnormalities in scanned medical images.

One of the many uses of PET is in the study of the viability and health of the human heart. The left ventricle is the main pump in the heart. The heart can be studied in detail during its uptake of radiopharmaceuticals, such as fluorodeoxyglucose (FDG) and ammonia. Trans-axial imaging modalities have revealed that the human heart is tilted down and back in the chest cavity. Many software tools can be used to perform detailed analysis of cardiac PET studies, but require that the heart be located and reoriented before accepting the image data of the heart as input. Although the two angles of tilt can be manually removed in a variety of ways, there is always some variability between operators or even successive attempts by the same operator.

SUMMARY

Described herein are systems and methods for automatically finding an organ in image data. In accordance with one aspect, a predetermined view of the organ is approximated by transforming the original image data to generate transformed image data. A best-match region in the transformed image data that best matches a synthesized geometric shape may then be found. The best-match region may be transformed into a volume space of the original image data to generate a location of the organ.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
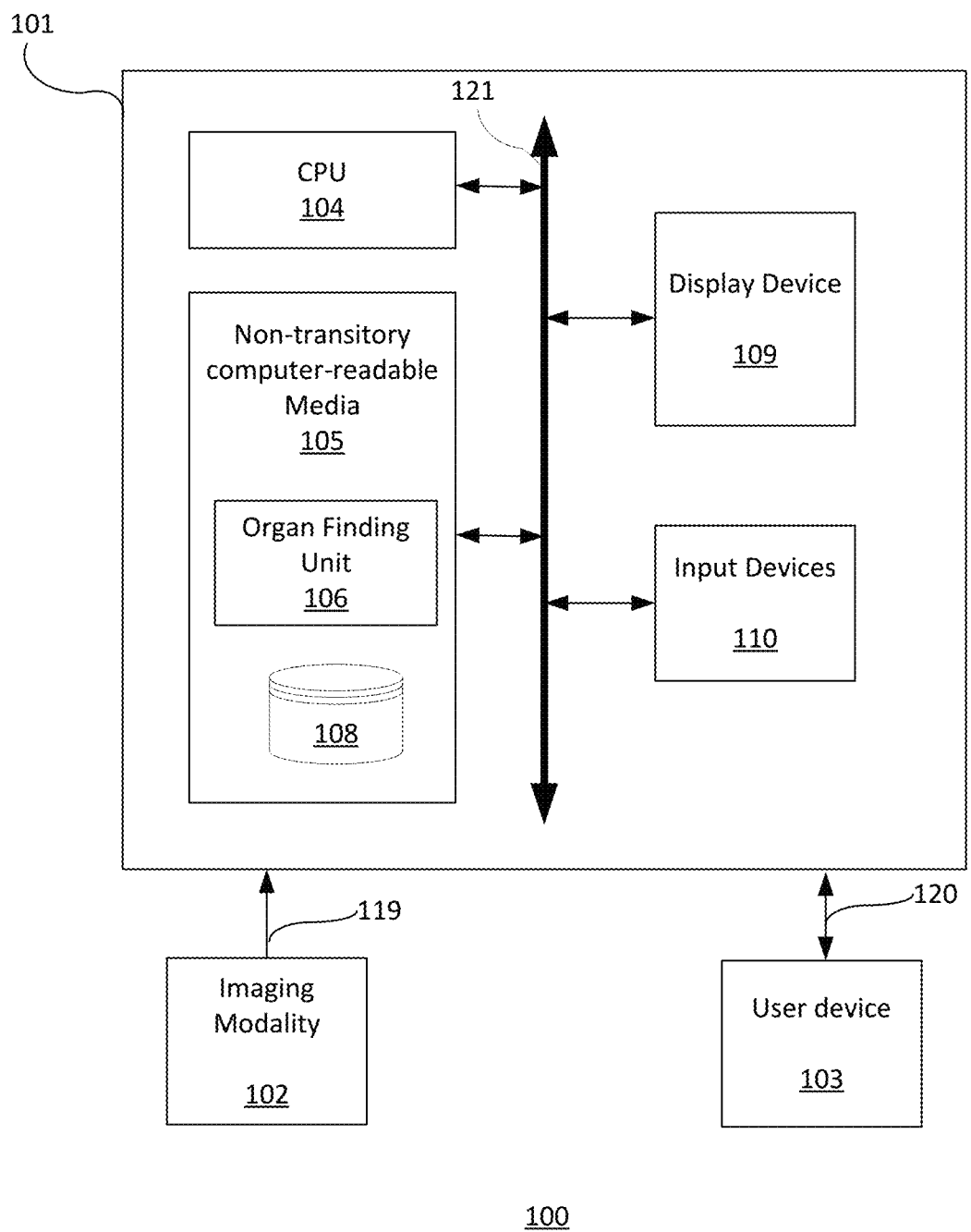
FIG. 1 is a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displays as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

A framework for automatic organ finding is described herein. In accordance with one aspect, the framework autonomously finds the location of an organ (e.g., heart) in a nuclear image volume (e.g., PET or SPECT). The framework exploits the unique shape and orientation of the organ in, for example, a typical human body. One implementation of the framework finds the organ by first rotating the patient nuclear image data to approximate a predetermined view (e.g., short axis view with isotropic pixels). The organ may then be found (or located) by matching a synthetically created three-dimensional (3D) geometric shape (e.g., cylinder) with the nuclear image volume using, for example, normalized cross correlation.

Testing has been performed on a significant number of PET and SPECT volumes with very high rates of success. The framework robustly finds the location of the organ in PET and SPECT image data, even with large axial fields-of-view (FOVs). For purposes of illustration, the present framework is described herein in the context of finding the heart. However, it should be appreciated that the framework may be applied to find other organs, such as the liver, brain, spleen, stomach, and so forth. These and other exemplary features and advantages will be described herein.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as a user device 103. In a networked deployment, computer system 101 may operate in the capacity of a server (e.g., thin-client server, such as syngo.Via® by Siemens Healthineers®), a cloud computing platform, a client user machine in server-client user network environment, or as a peer machine in a peer-to-peer (or distributed) network environment.

In one implementation, computer system 101 comprises a processor or central processing unit (CPU) 104 coupled to one or more non-transitory computer-readable media 105 (e.g., computer storage or memory), a display device 109 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 105. In particular, the present techniques may be implemented by organ finding unit 106. Organ finding unit 106 may be a standalone component or integrated with another system, such as an electronic medical records (EMR) system.

Non-transitory computer-readable media 105 may include random access memory (RAM), read-only memory (ROM), magnetic floppy disk, flash memory, and other types of memories, or a combination thereof. The computer-readable program code is executed by CPU 104 to process data. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 108. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging modality 102 acquires image data 119 for processing by organ finding unit 106. Such image data 119 may be processed by organ finding unit 106 and stored in database 108. Imaging modality 102 may be a radiology or nuclear medicine imaging scanner. Imaging modality 102 may acquire the image data 119 by magnetic resonance (MR) imaging, computed tomography (CT), helical CT, x-ray, positron emission tomography (PET), fluoroscopy, ultrasound or single photon emission computed tomography (SPECT). Other types of imaging modalities may also be used to acquire the image data 119.

User device 103 may include a computer (e.g., mobile computing device, personal tablet) and appropriate peripherals, such as a keyboard and display device, and can be operated in conjunction with the entire system 100. User device 103 may include, for example, an App that presents a graphical user interface generated by organ finding unit 106 and collects input data 120 for manipulating data processing by organ finding unit 106. User input data 120 may be received via an input device (e.g., keyboard, mouse, touch screen, voice or video recognition interface, etc.) implemented in the user device 103.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
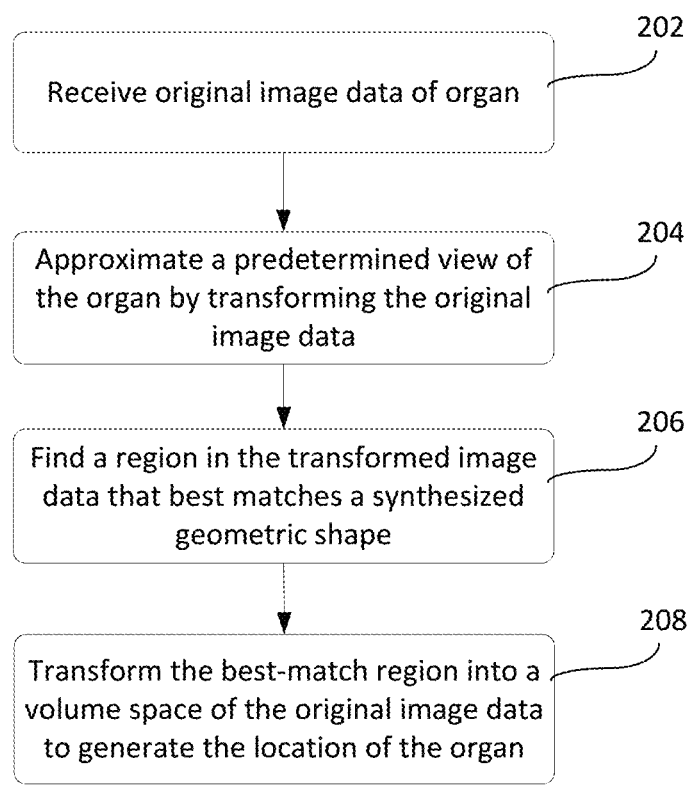
FIG. 2 shows an exemplary method of automatic organ finding.

FIG. 2 shows an exemplary method 200 of automatic organ finding by a computer system. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, organ finding unit 106 receives original image data 119 of an organ. The original image data 119 may be received from, for example, imaging modality 102 or database 108. The image data 119 may be a three-dimensional (3D) volume. The organ may be a human heart or other structure of interest (e.g., liver, brain, spleen, stomach) identified for study. In some implementations, the image data 119 is acquired by a nuclear scan (e.g., PET or SPECT) using a perfusion tracer that provides uptake in the myocardium of the heart. The present framework may not assume that the heart is the highest uptake in the volume, but may assume that there is uptake in at least half of the left ventricle. Other types of image data may also be received.

At 204, organ finding unit 106 approximates a predetermined view of the organ by transforming the original image data 119. In some implementations, the predetermined view is a short-axis view. In the context of a human heart, it is known that the long axis of a human heart is typically angulated in left-right and anterior-posterior direction within the chest wall by known angles. The short-axis view of the heart is the plane perpendicular to the long axis of the heart. This view provides an excellent cross-sectional view of the left and right ventricles and often displays the cardiac skeleton and valve annuli. Other types of view may also be approximated.

The original image data 119 may be transformed by rotation. For example, an approximate short-axis view of the heart may be created by rotating the original image data 119 by the predetermined known angles. Scaling may also be performed in order to create isotropic voxels. Each isotropic voxel has the same sizes in all directions and only one intensity. Scaling may be performed using a matrix transformation by expanding the 3D coordinates to homogeneous coordinates in four dimensions. In this way, 3D rotation and scaling may be performed on coordinates of each voxel in the patient coordinate system using a 4×4 matrix multiplication represented by a matrix transformation T.

The matrix transformation T may be defined as follows:

$$T = Sc * Rz * Ry \quad (1)$$

$$Sc = \begin{bmatrix} sx & 0 & 0 & 0 \\ 0 & sy & 0 & 0 \\ 0 & 0 & sz & 0 \\ 0 & 0 & 0 & 1 \end{bmatrix} \quad (2)$$

$$sx = \frac{dP}{dx} \quad sy = \frac{dP}{dy} \quad sz = \frac{dP}{dz} \quad (3)$$

wherein Sc is the scaling matrix, Rz is the z-axis rotation matrix, Ry is the y-axis rotation matrix, dP is the desired voxel size and (dx,dy, dz) is the actual voxel spacing in the image data.

$$Rz = \begin{bmatrix} \cos(\theta_z) & -\sin(\theta_z) & 0 & 0 \\ \sin(\theta_z) & \cos(\theta_z) & 0 & 0 \\ 0 & 0 & 1 & 0 \\ 0 & 0 & 0 & 1 \end{bmatrix} \quad (4)$$

$$Ry = \begin{bmatrix} \cos(\theta_y) & \sin(\theta_y) & 0 & 0 \\ 0 & 1 & 0 & 0 \\ -\sin(\theta_y) & \cos(\theta_y) & 1 & 0 \\ 0 & 0 & 0 & 1 \end{bmatrix} \quad (5)$$

wherein θz=angle of rotation around the z-axis and θy=angle of rotation around the y-axis of the patient coordinate system. For a human heart, the approximate predetermined angles are θz=−55° and θy=65°. Once the image data is in an approximate short-axis view, the left ventricle typically resembles a cylinder or bullet shape.

Figures 3A, 3B:
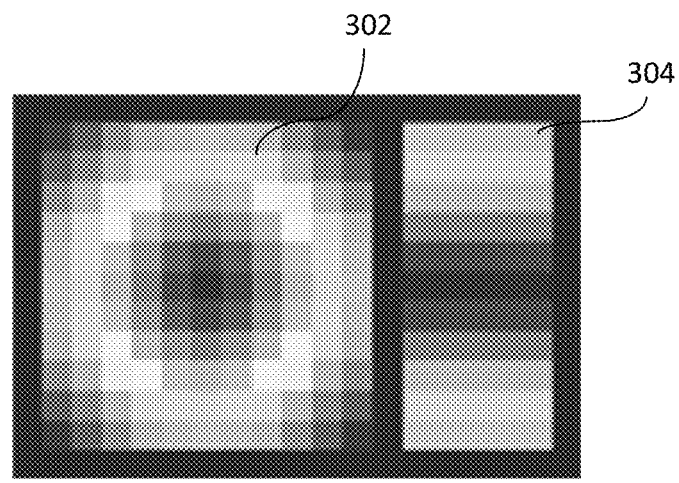
FIG. 3a shows the horizontal view and longitudinal view of an exemplary synthesized cylinder.
FIG. 3b shows an exemplary one-dimensional binomial expansion of a low pass filter.

At 206, organ finding unit 106 finds a best-match region in the transformed image data that best matches a synthesized geometric shape. The best-match region then indicates the location of the organ in the predetermined view. The geometric shape is synthetically created to approximate the shape of the organ in the predetermined view. In the context of a human heart, the geometric shape is a 3D cylinder. Other shapes, such as a cube, cuboid, sphere, spheroid, prism or polyhedron, are also useful. FIG. 3a shows the horizontal view 302 and longitudinal view 304 of an exemplary synthesized cylinder after filtering with the low pass filter 310 shown in FIG. 3b. In some implementations, the cylinder is synthesized by repeating a circle over multiple slices and performing low pass filtering. Each point (x, y, z) of the cylinder may be represented by the following:

$$x(z)=r*\cos(0:2\pi), y(z)=r*\sin(0:2\pi), z=1: L \quad (6)$$

wherein r is the radius of the cylinder and L is its length.

The low pass filtering may be performed by using a recursive 2×2 spatial filter. FIG. 3b shows an exemplary one-dimensional binomial expansion 310 of a low pass filter, which approximates a Gaussian filter after some number of iterations. The low pass filter may be expanded to three dimensions for filtering both the synthesized cylinder and the patient image data.

In order to find the best-match region, a normalized cross correlation may be performed between the synthesized geometric shape and the transformed image data in three dimensions. The normalized cross correlation (NCCi) for some location i in the transformed image data can be thought of as a matched filter across the transformed image data to this expected geometric shape (e.g., cylinder or any other shape). The reference (or expected) geometric shape (REF)

is matched against the rotated image data (SERi), wherein i=(x, y, z) location in the rotated image data that is searched. NCCi may be defined as follows:

$$NCC_i = \frac{(REF) - \overline{REF})(SER_i - \overline{SER_i})}{STD(REF) * STD(SER_i)} \quad (7)$$

wherein STD represents the standard deviation. This correlation results in a 3D surface, wherein the peak value of the 3D surface defines the best-match region of the geometric shape (e.g., cylinder). Since the organ size varies with patient size and age, multiple diameters or sizes of shapes may be used in the matching process and the best-match region across all sizes is declared to be the location of the organ.

Returning to FIG. 2, at 208, organ finding unit 106 transforms the best-match region back into a volume space of the original image data to generate the location of the organ. This may be performed by rotating the best-match region from, for example, the short axis view to the original image data volume space in the patient coordinate system. The coordinates of the transformed best-match region indicates the location of the organ in the original image data in the patient coordinate system.

Figure 4:
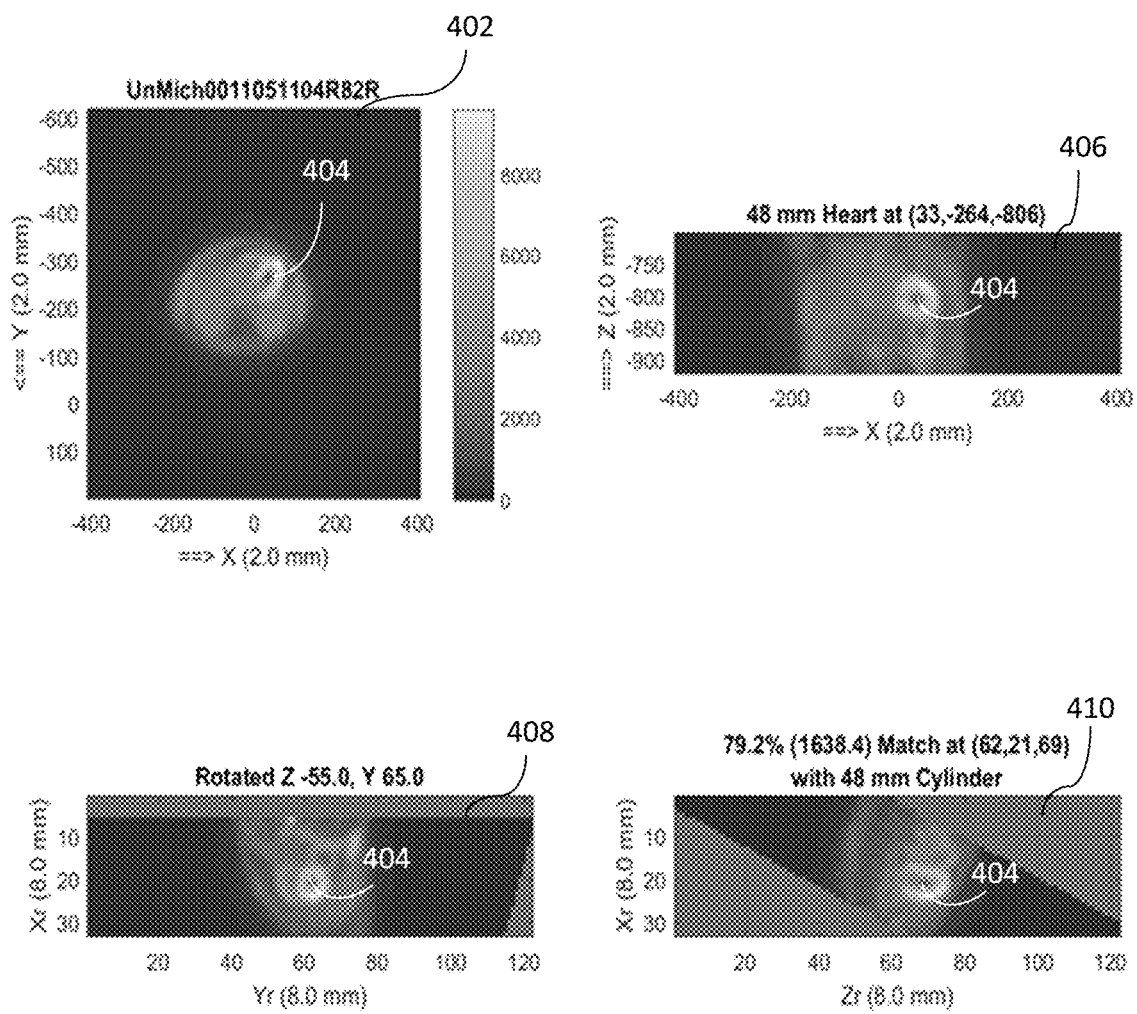
FIG. 4 shows various exemplary images of the original and transformed cardiac PET volume.

FIG. 4 shows various exemplary images of the original and transformed cardiac PET image data. The location of the heart is indicated by a cross-hair 404 in exemplary images 402, 406, 408 and 410 of the cardiac PET image volume. Images 402 and 406 show the original image data provided in patient coordinates. Images 408 and 410 show a short-axis view after the original image data is transformed. Image 410 shows a 79.2% best match with a 48 mm cylinder is found at the estimated location with coordinates (62, 21, 69). The estimated location is projected back into the volume space of images 402 and 406 to indicate the location of the heart at patient coordinates (33, −264, −806).

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for automatically finding a heart, comprising:
a non-transitory memory device for storing computer readable program code; and
a processor in communication with the memory device, the processor being operative with the computer readable program code to perform operations including
receiving original image data of the heart,
approximating a short-axis view of the heart by transforming the original image data to generate transformed image data, wherein a left ventricle of the heart in the short-axis view resembles a cylinder,
generating a synthetic creation of the cylinder by performing low pass filtering,
finding a best-match region in the transformed image data that best matches the synthetic creation of the cylinder, and
transforming the best-match region into a volume space of the original image data to generate a location of the heart.

2. The system of claim 1 wherein the processor is operative with the computer readable program code to transform the original image data by rotating the original image data by predetermined angles.

3. The system of claim 2 wherein the processor is operative with the computer readable program code to transform the original image data by scaling the original image data to generate isotropic voxels.

4. The system of claim 3 wherein the processor is operative with the computer readable program code to transform the original image data by multiplying a scaling matrix, a z-axis rotation matrix and a y-axis rotation matrix.

5. A method for automatically finding an organ, comprising:
receiving original image data of the organ;
approximating a predetermined view of the organ by transforming the original image data to generate transformed image data, wherein the organ in the predetermined view resembles a three-dimensional geometric shape;
generating a synthetic creation of the three-dimensional geometric shape by performing low pass filtering;
finding a best-match region in the transformed image data that best matches the synthetic creation of the three-dimensional geometric shape; and
transforming the best-match region into a volume space of the original image data to generate a location of the organ.

6. The method of claim 5 wherein the organ comprises a heart, liver, brain, spleen or stomach.

7. The method of claim 5 wherein the approximating the predetermined view of the organ comprises approximating a short-axis view of a heart.

8. The method of claim 5 wherein the transforming the original image data comprises rotating the original image data by predetermined angles.

9. The method of claim 8 wherein the transforming the original image data further comprises scaling the original image data to generate isotropic voxels.

10. The method of claim 9 wherein the transforming the original image data comprises multiplying a scaling matrix, a z-axis rotation matrix and a y-axis rotation matrix.

11. The method of claim 5 wherein generating the synthetic creation of the three-dimensional geometric shape comprises generating a cylinder, cube, cuboid, sphere, spheroid, prism or polyhedron that resembles a shape of the organ in the predetermined view.

12. The method of claim 5 wherein generating the synthetic creation of the three-dimensional geometric shape further comprises creating a three-dimensional cylinder that resembles a shape of the organ in the predetermined view.

13. The method of claim 12 wherein creating the three-dimensional cylinder comprises repeating a circle over multiple slices.

14. The method of claim 5 wherein finding the best-match region in the transformed image data that best matches the synthetic creation of the three-dimensional geometric shape comprises performing a normalized cross correlation between the synthetic creation of the three-dimensional geometric shape and the transformed image data.

15. The method of claim 14 wherein performing the normalized cross correlation results in a three-dimensional surface, wherein a peak value of the three-dimensional surface defines the best-match region.

16. The method of claim 5 wherein finding the best-match region in the transformed image data that best matches the synthetic creation of the three-dimensional geometric shape comprises using multiple sizes of the synthetic creation of the three-dimensional geometric shape to find the best-match region.

17. The method of claim 5 wherein transforming the best-match region into the original image data comprises rotating the best-match region from the predetermined view to the volume space of the original image data.

18. One or more non-transitory computer-readable media embodying instructions executable by machine to perform operations, comprising:
   receiving original image data of an organ;
   approximating a predetermined view of the organ by transforming the original image data to generate transformed image data, wherein the organ in the predetermined view resembles a three-dimensional geometric shape;
   generating a synthetic creation of the three-dimensional geometric shape by performing low pass filtering;
   finding a best-match region in the transformed image data that best matches the synthetic creation of the three-dimensional geometric shape; and
   transforming the best-match region into a volume space of the original image data to generate a location of the organ.

19. The one or more non-transitory computer-readable media of claim 18 wherein the organ comprises a heart, liver, brain, spleen or stomach.

20. The one or more non-transitory computer-readable media of claim 18 wherein the synthetic creation of the three-dimensional geometric shape comprises a cylinder, cube, cuboid, sphere, spheroid, prism or polyhedron.

* * * * *